(12) United States Patent
Hattrup et al.

(10) Patent No.: US 9,301,356 B2
(45) Date of Patent: Mar. 29, 2016

(54) LIGHT GENERATING DEVICE

(75) Inventors: Christian Hattrup, Wurselen (DE);
Henricus Marius Joseph Maria Kahlman, Dongen (NL); Ralph Kurt, Eindhoven (NL); Georg Sauerländer, Aachen (DE); Bertrand Johan Edward Hontele, Breda (NL); Haimin Tao, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/117,391

(22) PCT Filed: May 11, 2012

(86) PCT No.: PCT/IB2012/052346
§ 371 (c)(1),
(2), (4) Date: Nov. 13, 2013

(87) PCT Pub. No.: WO2012/156878
PCT Pub. Date: Nov. 22, 2012

(65) Prior Publication Data
US 2015/0061499 A1    Mar. 5, 2015

(30) Foreign Application Priority Data
May 19, 2011    (EP) .................................. 11166696

(51) Int. Cl.
*H05B 37/02*     (2006.01)
*H05B 33/08*     (2006.01)

(52) U.S. Cl.
CPC .......... *H05B 33/0824* (2013.01); *H05B 33/083* (2013.01); *H05B 33/0809* (2013.01); *H05B 33/0815* (2013.01); *Y02B 20/347* (2013.01)

(58) Field of Classification Search
CPC ...................................................... H05B 37/02
USPC ............. 315/294, 291, 297, 209 R, 246, 295, 315/299, 306, 308, 307, 310, 311
See application file for complete search history.

(56) References Cited

U.S. PATENT DOCUMENTS

2008/0297059 A1    12/2008    Nisani et al.
2009/0230883 A1    9/2009     Haug
(Continued)

FOREIGN PATENT DOCUMENTS

DE    102006024607 A1    11/2007
WO       2007074446 A2     7/2007
(Continued)

*Primary Examiner* — Minh D A

(57) ABSTRACT

A light generating device (1) is provided with at least a voltage input (21) adapted for receiving a variable voltage, at least three LED circuits (10), coupled with said voltage input (21), wherein each LED circuit (10) comprises a LED unit (14) and controllable current regulator (15) to control the current through said LED circuit (10). The light generating device (1) further comprises a controllable switch matrix (30) comprising a plurality of switches (25, 26, 27), said switch matrix (30) is configured to operate in at least three different switching modes and a controller (50), connected at least with said switch matrix (30), configured to determine said variable operating voltage and to control the switching mode of said switch matrix (30) in dependence of the determined operating voltage. To provide an efficient operation of such device (1) with a variable operating voltage, such as an AC voltage, in a first switching mode, said LED units (10) are connected parallel to each other, in a second switching mode, at least two of said LED units (10) are connected in series and in a third switching mode, said LED units 10 are connected in series with each other.

18 Claims, 7 Drawing Sheets

(56) References Cited

U.S. PATENT DOCUMENTS

| | | |
|---|---|---|
| 2010/0134018 A1* | 6/2010 | Tziony et al. .................. 315/122 |
| 2010/0231135 A1 | 9/2010 | Hum et al. |
| 2010/0308739 A1* | 12/2010 | Shteynberg et al. .......... 315/193 |
| 2011/0062872 A1 | 3/2011 | Jin et al. |
| 2011/0062882 A1* | 3/2011 | Kuo et al. ..................... 315/287 |
| 2011/0068700 A1* | 3/2011 | Fan ........................... 315/185 R |

FOREIGN PATENT DOCUMENTS

| | | |
|---|---|---|
| WO | 2010013172 A1 | 2/2010 |
| WO | 2010027254 A1 | 3/2010 |
| WO | 2012131602 A1 | 10/2012 |

* cited by examiner

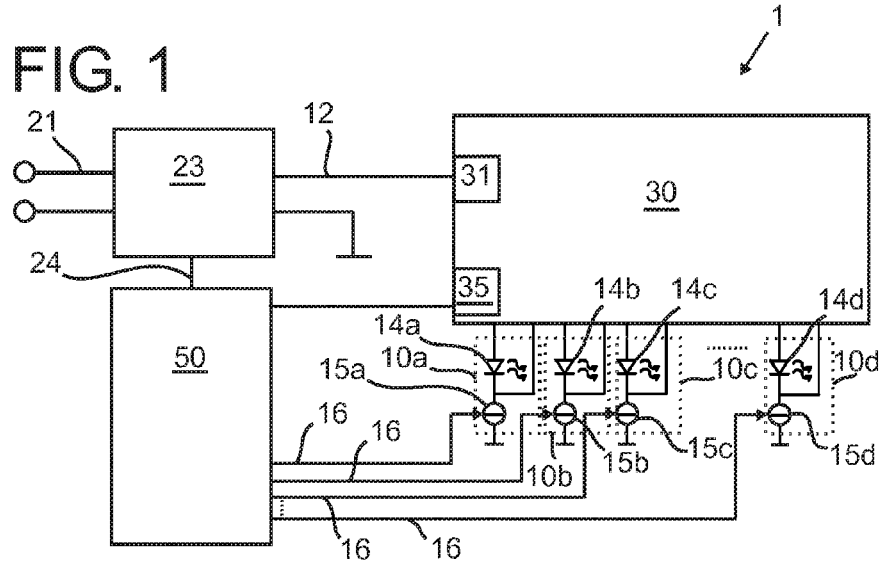
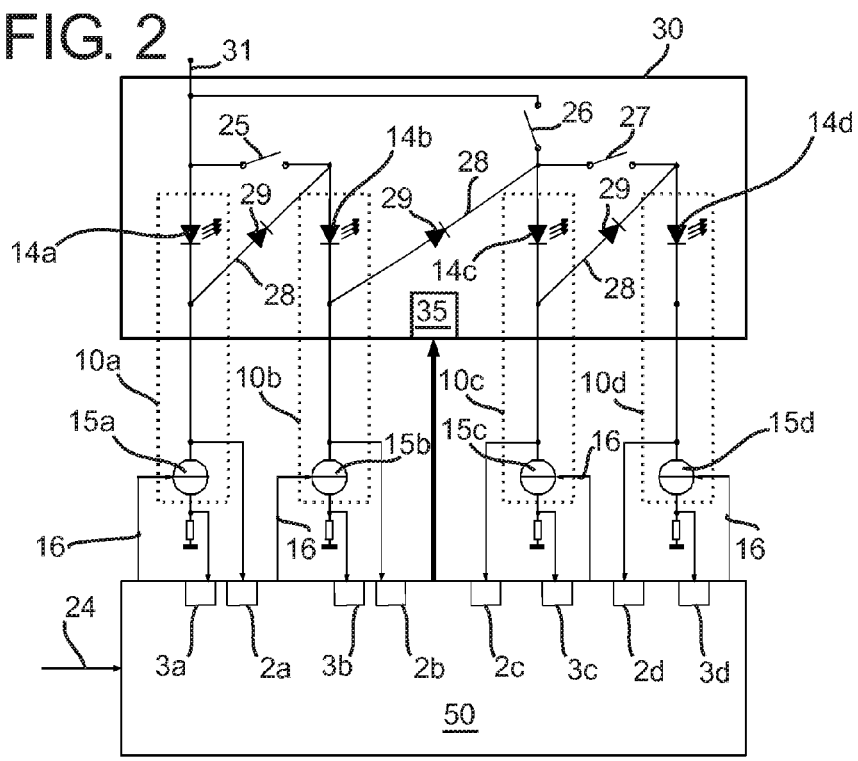

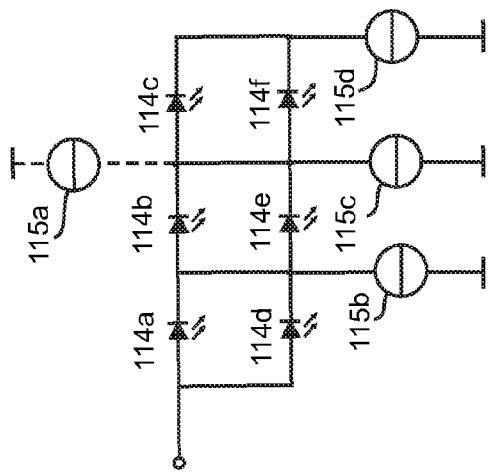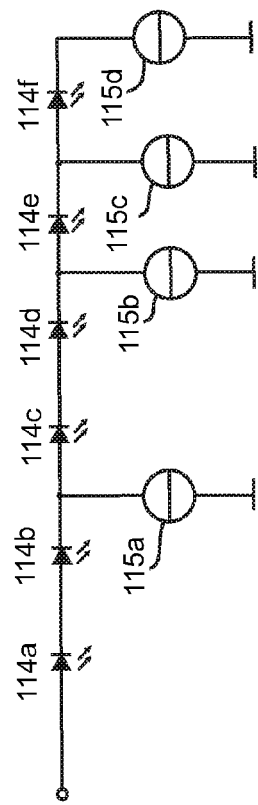
FIG.6A
FIG.6B

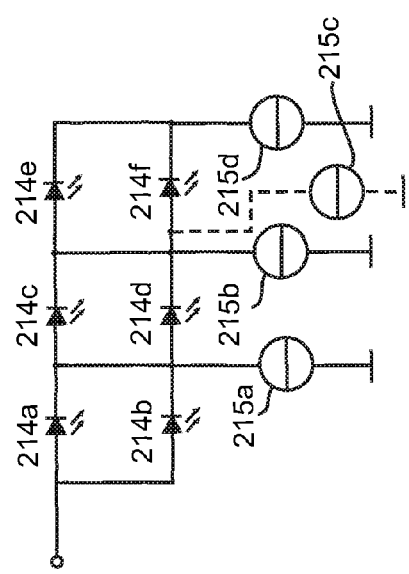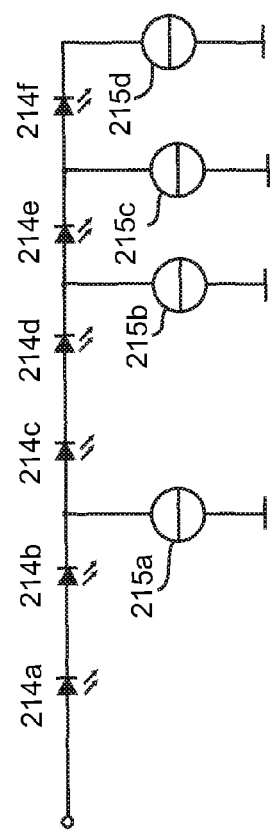
FIG.8A
FIG.8B

LIGHT GENERATING DEVICE

FIELD OF THE INVENTION

The present invention relates to a LED light generating device and a method of operating a LED light generating device. Specifically, the present invention relates to driving a LED light generating device with a variable voltage, such as an AC voltage.

BACKGROUND OF THE INVENTION

Light generating or lighting devices using LEDs are known in the art and are being used nowadays for a variety of lighting applications. Amongst others, such devices are used in retrofit applications, e. g. to replace common incandescent lamps. In the latter case, it is often required to drive the retrofit light generating device with a variable voltage, e. g. mains or AC voltage. Since LEDs typically cannot be driven directly with mains voltage, a power supply circuit is required.

To provide a relatively inexpensive setup for driving a LED light generating device with mains voltage, it is known to connect a plurality of LEDs in series, so that the overall voltage drop of the thus formed LED string corresponds to the mains voltage. However, due to the inherent alternating behavior of mains voltage, such an LED string cannot be operated during all phases of the AC waveform, i. e. light is not generated when the provided voltage drops below the overall forward voltage of the LED string. Accordingly such circuits often exhibit optical flicker and a relatively low current flow angle.

A further problem may occur when a LED light generating device is intended for use with different mains voltage level systems, such as a 230V mains system and a 120V mains system.

If a device designed for 230V mains is operated with 120V, the voltage will be significantly lower than the predefined overall forward voltage during the largest part of the waveform, leading to a visible flicker and a poor brightness.

If, on the other hand, a device designed for 120V is operated with 230V mains voltage, the voltage will be too high during large parts of the waveform and, although flicker may in fact be reduced, the surplus voltage usually is handled by a linear regulator or bleeder circuit, which results in large amounts of energy being dissipated. In either case, operation of the device with the "wrong" mains voltage is very inefficient.

A solution to the first problem is disclosed in WO 2010/013172 A1, which discloses an illumination device comprising multiple LEDs. According to the document, a plurality of LEDs is provided and connected with a switch matrix. The switch matrix is connected with a controller, so that the LEDs may be connected in multiple different control states, which are adapted for different voltage levels. The switch matrix allows to connect all LEDs mutually in series and in parallel. In a further control state, the LED groups are connected, so that two of said LEDs are connected in parallel and at least two of said LEDs are mutually connected in series. The controller is provided to set the control state of the switch matrix according to a signal, indicating the momentary value of the supplied AC voltage.

The setup of WO 2010/013172 A1 thus allows to adapt the configuration of the device according to the momentary AC voltage. Although selected, i.e. so-called "binned" LEDs are used, the process of selection or "binning" increases the overall manufacturing costs noticeably. Therefore, it is an object of the present invention to provide an enhanced light generating device.

SUMMARY OF THE INVENTION

The object is solved by a light generating device according to claims 1 or 13 and a method of operating a light generating device according to claim 17 or 18. Dependent claims relate to preferred embodiments of the invention.

The invention will hereinafter be described according to a first and a second aspect. The invention according to the first aspect also is referred to as "dynamic switching concept", while the second aspect is referred to as "tapped linear concept".

The basic idea of the invention according to the aforementioned first aspect is to provide a light generating device comprising at least three LED circuits. The light generating device is adapted to be set in at least two switching modes for providing light output when receiving a variable voltage. Each LED circuit comprises at least one LED unit and a controllable current regulator, connected with said LED unit to control the current in the LED circuit. The present invention advantageously enables to control the current in each of the LED circuits precisely, independent of the switching mode. Thus, even if the LED units show slightly different electrical characteristics, an accurate control of the currents is possible, enhancing the quality of the light output.

The light generating device according to the present invention comprises a voltage input, adapted for receiving a variable operating voltage, such as e. g. a typical AC mains voltage. At least three LED circuits are coupled with said voltage input, wherein each LED circuit comprises at least a LED unit and a controllable current regulator, connected with the respective LED unit of said LED circuit and configured to control the current in said LED circuit. Furthermore, the inventive light generating device comprises a controllable switch matrix, connected with said LED circuits and having a plurality of switches, said switch matrix being configured to operate in at least two different switching modes. A controller is provided and connected at least with said switch matrix. The controller is configured to determine said variable operating voltage, e.g. at said voltage input, and to control the switching mode of said switch matrix in dependence of the determined operating voltage.

According to the present aspect of the invention, at least two of the LED units of the three LED circuits are connected in parallel to each other in a first switching mode and are connected in series with each other in a second switching mode. For instance, in the first switching mode, two units can be connected in parallel with the third in series, while in the second switching mode, all units are connected in series. Alternatively, all three units may be connected in parallel in the first switching mode, while at least two units are connected in series in the second switching mode.

The light generating device according to the invention thus enables to adapt the setup of the light generating device according to the determined voltage, applied to the voltage input during operation and thus allows a "dynamic switching" based on the momentary voltage applied at said voltage input. The at least two switching modes differ from each other in the overall forward voltage of the light generating device. In the present context, the term "overall forward voltage" of the light generating device refers to the overall voltage drop over the LED circuits when said operating voltage is applied to the voltage input. Accordingly, it is possible to adapt the forward voltage of the device to the momentary value of the variable operating voltage.

While in general, a light generating device having three different control states is disclosed in applicant's prior application WO 2010/013172 A1, incorporated herein by reference, the present invention further enables to control the current through each of the LED units and independent of the switching mode. Accordingly, slight tolerances in the electrical characteristics of the LED units can be efficiently compensated, so that a dedicated selection process during manufacture, also referred to as "binning", can be advantageously omitted. Thus, high-quality light output is possible at reduced manufacturing costs.

As discussed above, the inventive light generating device comprises a voltage input, adapted for receiving a variable operating voltage. The operating voltage may e. g. correspond to an AC voltage, i.e. from a 120 V or 230 V mains connection. The inventive light generating device thus may preferably be adapted for AC operation.

In the context of the present invention, the term "variable operating voltage" refers to a voltage which varies over time. The variable operating voltage may be a periodically alternating voltage; however and most preferably, the variable operating voltage is a unipolar voltage, such as e. g. a rectified AC voltage.

The voltage input according to the invention may be of any suitable type and e. g. comprise at least two electric terminals, such as solder pads, bond wire pads or any other suitable connector or plug for connection to power or mains. The voltage input may certainly comprise further components or circuits, such as e. g. a rectifier for providing an unipolar variable voltage to the LED circuits or a filter device for smoothing the received operating voltage. Alternatively or additionally, the voltage input may comprise further mechanical components, for example in case the light generating device is provided to be removed from power, a corresponding separable electrical connector. Most preferably, the voltage input comprises a lamp socket, such as e.g. an E27 or E14 type socket.

As mentioned above, the light generating device according to the invention further comprises at least three LED circuits, coupled with said voltage input. The at least three LED circuits may be coupled with the voltage input directly or indirectly over intermediate components or circuitry, so that in case said operating voltage is supplied to the voltage input, a voltage may be applied to the LED circuits. Each of said LED circuits comprises, as mentioned above, at least a LED unit and a controllable current regulator. The current regulator is connected with the LED unit of the respective LED circuit and configured to control the current in said LED circuit.

The LED units may be of any suitable type and comprise at least one light emitting diode (LED), which in terms of the present invention may be any type of solid state light source, such as an inorganic LED, organic LED or a solid state laser, e. g. a laser diode. The LED unit may certainly comprise more than one of the before mentioned components, connected in series and/or in parallel.

For general lighting applications, the LED unit may preferably comprise at least one high-power LED, i.e. having a luminous flux of more than 1 lm. Preferably, said high-power LED provides a luminous flux of more than 20 lm, most preferred more than 50 lm.

The LED unit may certainly comprise further electric, electronic or mechanical components such as a driver unit, e. g. to set the brightness and/or color, a smoothing stage or a filter capacitor.

The before mentioned controllable current regulators may be of any suitable type to control a current in the associated LED circuit, in particular to control the current through the LED unit of the corresponding LED circuit in at least one of the switching modes. In the context of the present explanation, the term "current regulator" refers to an active electrical or electronic component capable of controlling and/or limiting the current to a predefined current level.

The current regulator may e. g. comprise a suitable current source or current drain device, such as a typical transistor, FET or OP-AMP current source. Suitable current sources may e.g. be found in chapter 13.3 of "Halbleiterschaltungstechnik", U. Tietze, Ch. Schenk, 10th edition, Springer Verlag.

The predefined current level may be factory-programmed in the respective current regulator. Alternatively or additionally, it is possible that the current regulator comprises a current control input, so that the predefined current level may be set externally. For example, the current control input may be set according to a signal, corresponding to the input voltage, e.g. to increase the current with the input voltage to improve the power factor or to reduce the current e.g. linearly with increasing input voltage to limit the overall input power of the system.

The inventive light generating device further comprises a controllable switch matrix, having a plurality of switches. As discussed above, the switch matrix is connected with said at least three LED circuits and is controllable to at least two different switching modes, wherein at least two of said LED units are connected in parallel to each other in a first switching mode, and are connected in series with each other in a second switching mode. The switches and the corresponding circuitry may be of any suitable type to provide that the switch matrix is controllable to the before mentioned at least two switching modes. Certainly and particularly in case more than three LED circuits are present, the switch matrix may be controllable to more than two different switching modes. Preferably, the switches are controllable semiconductor switches, such as in particular MOSFETs or bipolar transistors.

According to the invention, the light generating device further comprises a controller, connected at least with said controllable switch matrix. The connection between controller and switch matrix, i. e. the plurality of switches may be of any wired or wireless type to allow a control of the switching mode.

The controller is configured to determine said operating voltage and to control said switching mode of the switch matrix in dependence of the determined operating voltage. The controller may be of any suitable type and in particular, the controller may comprise a microcontroller, a computing device and/or an asynchronous state machine comprising at least a logic gate, a flip-flop and/or a comparator. As discussed above, the controller is configured to determine said operating voltage, i. e. at least a value, corresponding to the momentary amplitude of the variable operating voltage during operation of the light generating device. The controller may thus e. g. comprise at least a voltage detector, suitably connected with said voltage input. Such a detector may for example be adapted for a continuous operation or to recurrently provide a sampled value to the controller, corresponding to the momentary amplitude of the variable operating voltage. In particular in the latter case, the sampling frequency should preferably be adapted to evaluate the operating voltage in a quasi continuous way.

Herein, the controller is configured to recurrently determine a momentary amplitude of said variable operating voltage and to control the switching mode of said switch matrix in dependence said momentary amplitude. In this context, the term "recurrently" also includes continuous or quasi continuous determination of said amplitude.

As mentioned above, the controller is adapted to control the switching mode of said switch matrix in dependence of the determined operating voltage. While various control methods are possible, the controller may preferably be adapted to set the switching mode so that the overall forward voltage of the light generating device corresponds substantially to the momentary amplitude of the applied operating voltage. Accordingly, the switching mode is preferably selected, which provides an overall forward voltage, closely matching or approximating the applied operating voltage. For example, in said first switching mode, the abovementioned two LED circuits are connected parallel to each other, so that the overall forward voltage is lower than in the second switching mode, where the two LED units are connected in series. Certainly, it should be noted that the LED units may only be operated in case the applied operating voltage is equal to or exceeds the individual forward voltage, so that a switching mode should be preferably chosen to provide that the overall forward voltage of the light generating device is equal to or less than the momentary applied operating voltage.

The light generating device may certainly comprise further components, such as one or more further LEDs, a housing, one or more sockets, a smoothing stage, a flicker filter circuit and/or further control circuitry, e. g. to set the color of the emitted light in case of at least one RGB LED unit. Preferably, the light generating device is provided as an integrated unit, such as a lamp, most preferably adapted for retrofit applications.

As discussed above, the current regulators of said LED circuits are provided to control the current in the respective LED circuit, e. g. to a predefined current level. The respective current level may be set internally and/or may vary over time. For example, the current level may be stored in a suitable memory of the regulator, or e. g. using said current control input to provide said predefined current level externally.

The dynamic switching concept according to the present aspect may be applied alternative to the abovementioned "tapped linear concept", although it is within the scope of the invention to combine both concepts.

In a preferred embodiment, the switch matrix is configured to operate in at least three different switching modes. Herein, the switch matrix is configured so that at least two LED units are connected in parallel in the first switching mode and are connected in series in the second switching mode.

It is particularly preferred that in the first switching mode, all of said LED units are connected parallel to each other, in the second switching mode, at least two of said LED units are connected in series, and in a third switching mode, all of said LED units are connected in series with each other.

This embodiment allows for a more accurate adaption of the overall forward voltage. For example, in said first switching mode, the LED circuits are connected parallel to each other, so that the overall forward voltage is lower than in the second switching mode, where at least two of the LED units are connected in series. Correspondingly, the overall forward voltage of the light generating device in the third switching mode is higher than the overall forward voltage in the second switching mode.

Additionally or alternatively to the above and in an especially preferred embodiment of the invention, the light generating device comprises a voltage input, adapted for receiving a variable operating voltage, such as e. g. a typical AC mains voltage. At least three LED circuits are coupled with said voltage input, wherein each LED circuit comprises at least a LED unit and a controllable current regulator, connected with the respective LED unit of said LED circuit and configured to control the current in said LED circuit. Furthermore, the light generating device comprises a controllable switch matrix, connected with said LED circuits and having a plurality of switches, said switch matrix being configured to operate in at least three different switching modes. A controller is provided and connected at least with said switch matrix. The controller is configured to determine said variable operating voltage, e.g. at said voltage input, and to control the switching mode of said switch matrix in dependence of the determined operating voltage.

According to this embodiment and in a first switching mode of the switch matrix, the LED units of said at least three LED circuits are connected parallel to each other. In a second switching mode, at least two LED units are connected in series with each other and in a third switching mode, the LED units of said at least three LED circuits units are connected in series.

According to a development of the invention, the controller is connected with at least one of said current regulators to control the current in the respective LED circuit. The connection may be of any suitable wired or wireless type to allow control of the current in the respective LED circuit by the controller.

Preferably, the controller is connected with each of the current regulators in the at least three LED circuits. In the latter case it is most preferred, that the controller is adapted to control each of said current regulators independently. The present embodiment advantageously allows setting the current according to the determined variable operating voltage and the correspondingly chosen switching mode to allow a further improved control of the device and in particular of the currents in said LED circuits in case of LED units exhibiting differing electrical properties.

According to a preferred embodiment of the invention, at least one of said current regulators is at least controllable to a nominal current mode and an OFF mode. In said nominal mode, the current regulator is controlled, so that the current through the current regulator does not exceed a predefined maximum current. In said OFF mode, no substantial current flows through said current regulator. The respective mode may e.g. be set by the controller, for example using the above mentioned current control input.

Preferably, the current regulator is configured, so that the current in said nominal mode corresponds to the nominal current of the LED unit of the respective LED circuit.

According to a development of the invention, at least one of said current regulators is controllable to a reduced current mode, in which during operation the current through said current regulator is lower than the current in said nominal current mode. The corresponding current level in the reduced current mode may be chosen in dependence of the application and in particular according to the number of LED circuits and the respective switching mode of the switch matrix. For example, the current regulator in said reduced current mode may preferably be set to a value, corresponding substantially to $\frac{1}{2}$ and/or $\frac{1}{3}$ of the current in the nominal current mode. Depending on the light output quality requirements, the tolerance of the current setting in the reduced current mode may be $\pm 50\%$, preferably however not exceeding $\pm 20\%$ of the above values of $\frac{1}{2}$ and/or $\frac{1}{3}$. The above values with regard to the term "substantially" are thus understood to comprise deviations.

To allow an even further enhanced control of the light output of each of the LED units and in a preferred embodiment of the invention, the controller comprises at least a voltage detector, adapted to determine a voltage in at least one of said LED circuits. The controller is further configured to control the switching mode in dependence of the determined voltage.

The present embodiment allows a further enhanced selection of the switching mode, since, as discussed above, the electrical characteristics of each of the LED units might differ due to manufacturing tolerances, in particular with regard to the respective forward voltage. Accordingly, the determination of the voltage in the LED circuit allows to efficiently compensate for differing forward voltages.

The voltage detector may be of any suitable type to determine at least a voltage in said LED circuit during operation. The detector may e.g. be adapted to determine a voltage, present during operation over the LED unit. However, preferably, the voltage detector is adapted to determine the voltage over the respective current regulator of the LED circuit. Most preferably, the detector is adapted to determine a voltage in each of said LED circuits for a further improved control. Alternatively, multiple voltage detectors are provided.

Additionally or alternatively, the controller may comprise at least a current detector, adapted to determine a current in at least one of said LED circuits. The controller in this case may preferably be adapted to control said switching mode in dependence of the determined current. The present embodiment allows a particularly advantageous control and selection of an appropriate switching mode because of the above mentioned eventual differences in the electrical characteristics of the LED units. The current detector may be of any suitable type to determine at least a current in said LED circuit during operation, e.g. a current through said current regulator. Preferably, the current detector is adapted to determine a current in each of said LED circuits. Alternatively, multiple current detectors are present. The controller is preferably adapted to switch from a switching mode with lower overall forward voltage to a switching mode with a higher overall switching voltage on a basis of the variable operating voltage and the voltage, determined by said at least one voltage detector. In the respective other case, i.e. when switching from a switching mode with a higher overall forward voltage to a switching mode with a lower overall forward voltage, the controller may be adapted to switch on the basis of the current, determined by said at least one current detector. However, it is preferred that the controller is adapted to switch from a switching mode with a higher overall forward voltage to a switching mode with a lower overall forward voltage when the voltage, determined by said at least one voltage detector, is below a predefined threshold value. The threshold value may preferably be selected between 5%-20% and most preferably between 3%-10% of the overall forward voltage of one LED unit.

Most preferably, the controller comprises a current detector and a voltage detector for a further improved control of the switching mode in dependence of the variable operating voltage.

As discussed above, the switch matrix may be controllable to at least three different switching modes, wherein the overall forward voltage of the device in each of the three switching modes differs from each other. While the first and third switching mode refer to low and high overall forward voltages, respectively, the second switching mode provides an intermediate forward voltage, where at least two of said LED units are connected in series.

To provide an enhanced light output, it is preferred that in the second switching mode, at least two of said LED units are connected in series while simultaneously at least two of said LED units are connected parallel to each other. Accordingly, in the present example of three LED circuits, all LED units of the LED circuits are supplied with an operating current in said second mode while simultaneously providing an intermediate overall forward voltage. Thus, optical flicker is advantageously further reduced.

To provide a control of the current in each of said LED circuits, the corresponding current regulators are provided and connected with the respective LED unit, as discussed above. The current regulators provide control of the current in said LED circuits at least in one of the switching modes. According to a further preferred embodiment, the LED circuits are configured, so that at least in said first switching mode, in particular when all LED units are connected in parallel, the LED unit of each LED circuit is connected in series with the respective current regulator of said LED circuit. The present embodiment thus enables an advantageous control of the current in each LED circuit, even in case of a parallel connection of the LED units and/or the LED circuits according to said first switching mode.

As discussed in the preceding, certainly more than said three switching modes are possible, in particular in case the light generating device comprises more than three LED circuits. Preferably, the light generating device is provided with four LED circuits, each comprising at least a LED unit and a corresponding current regulator, as discussed above. In case of at least four LED circuits, it is preferred that the switch matrix is configured to operate in a fourth switching mode, in which at least three of said LED units are connected in series. Most preferably in said fourth switching mode, at least three LED units are connected in series, while at least two of said LED units are connected parallel to each other.

According to a further preferred embodiment, the LED circuits comprise multiple LED units and configuration circuitry to provide voltage level adaptation.

The configuration circuitry is adapted to connect at least two of the multiple LED units in (each) LED circuit in parallel to each other in a first state and in series with each other in a second state.

The light generating device according to the present embodiment thus enables to adapt the general or basic setup of the light generating device according to the (mains) voltage level, since the at least two states differ from each other in the overall forward voltage of the light generating device. Accordingly, the present embodiment due to the at least two states allows an adaptation of the device and more precisely of the LED circuits to the mains voltage level (e.g. 120V/230V).

In particular, the state of the configuration circuitry may be set once before or when the device is connected to the power supply. The first (second) state corresponds to a lower (higher) maximum voltage that is to be expected.

In one preferred embodiment, the state of the configuration circuitry is mechanically changeable. The configuration state may in particular be a changeable by at least one jumper which is repositioned corresponding to a state. The state may be set in a factory or in a store before the light generating device is sold and/or it may be set by a customer before use. It may e.g. be set manually or by means of simple tools like a screwdriver or tweezers.

Since one device will often be intended for use in a region with a known mains voltage, the state of the configuration circuitry can be adapted without the need for a controller to detect the voltage. The situation is similar with a customer who knows what mains voltage is used in his home region. Although this embodiment is not "fail-safe" in that a wrong state may be chosen, it may be cost-efficient by simplifying the required control circuitry.

Alternatively or additionally, the configuration circuitry may e.g. comprise several MOSFETs as variable connectors and the controller may be connected to the basis of each MOSFET to control its resistance. Accordingly, the configuration circuitry here may form part of the switch matrix. In general, the connection between controller and configuration circuitry may be of any wired or wireless type.

In the preceding embodiment, it is further preferred that the controller configured to control the configuration circuitry and that the controller is additionally configured to determine an effective value of the variable operating voltage and to control the switching mode of said configuration circuitry and/or switch matrix in dependence said effective value.

Herein, "effective value" refers to any value characteristic of the mean magnitude of the voltage over time. E.g., such effective value may refer to the root mean square value of the voltage (i.e. ca. 230V for European mains voltage) or to the amplitude, (i.e. ca. 325V for European mains voltage). In this embodiment, the controller additionally detects the type of voltage supply at least one time, preferably immediately after the light generating device is connected to a power supply or after it is switched on. Since detection will start at a random point in time, the controller must monitor the time evolution of the voltage at least for some time (e.g. for several periods). For a sinusoidal voltage for instance, in a first step, the period length may be determined by detecting the zero crossings of the voltage while in a second step, the amplitude is determined by measuring the voltage half of a period after a zero crossing.

On the basis of the determined effective value, the controller may control the basic setup of the switching mode according to the respective voltage level, e.g. a general parallel or serial setting.

In case each of the LED circuits comprise two LED units, it is particularly preferred that the controller connects the two LED units in series with each other in case the effective voltage corresponds to the voltage of a 230V mains grid. Additionally or alternatively and further preferred, the controller connects the two LED units parallel to each other in case the effective voltage corresponds to the voltage of a 120V mains grid.

According to the inventive method of operating a light generating device according to the present aspect of the invention, the light generating device is provided with at least a voltage input for receiving a variable operating voltage and at least three LED circuits, coupled with said voltage input, wherein each LED circuit comprising at least a LED unit and a controllable current regulator, connected with said LED unit and configured to control a current in said LED circuit. Said light generating device further comprising a controllable switch matrix, connected at least with said at least three LED circuits and comprising a plurality of switches, said switch matrix is configured to operate in at least two different switching modes in dependence of said variable operating voltage. At least two of said LED units are connected parallel to each other in a first switching mode, and are connected in series in a second switching mode.

Certainly, the light generating device may be operated according to one or more of the above embodiments.

The light generating device according to the second aspect of the invention, i.e. the "tapped linear concept", comprises a voltage input, adapted for receiving a variable operating voltage, such as e. g. a typical AC mains voltage. At least two LED units are coupled with said voltage input. Furthermore, the light generating device comprises configuration circuitry, connected with said at least two LED units, said configuration circuitry being adapted to connect at least two of said LED units in parallel with each other in a first state and in series with each other in a second state to provide voltage level adaptation.

The light generating device according to the present aspect of the invention also comprises at least one controllable shunt path, which is arranged to provide at least in said second state a low voltage mode, in which said shunt path provides a bypass to at least one LED unit. The light generating device is configured that the bypass is provided in dependence of a momentary amplitude of said operating voltage.

As discussed above, the configuration circuitry is adapted to connect the at least two LED units in parallel to each other in a first state, and in series with each other in a second state. The light generating device according to the invention thus enables to adapt the setup of the light generating device according to the voltage, applied to the voltage input during operation. The at least two states differ from each other in the overall forward voltage of the light generating device. In the present context, the term "overall forward voltage" of the light generating device refers to the overall voltage drop over the LED units when said operating voltage is applied to the voltage input.

In particular, as will be discussed below, the state of the configuration circuitry may be set once before or when the device is connected to the power supply. The first (second) state corresponds to a lower (higher) maximum voltage that is to be expected.

Additionally, continuous changes in the momentary amplitude of the supply voltage (e.g. in a rectified sinusoidal voltage) are accounted for by the at least one shunt path. If the momentary voltage is too low to power all LED units, the shunt path may provide a bypass to at least one LED unit, so that the (effective) overall forward voltage is reduced.

Accordingly, the invention according to the present second aspect due the at least two states allows an adaptation of the device to the mains voltage level (e.g. 120V/230V) and simultaneously provides a "dynamic" adaptation of the forward voltage of the device to the variable operating voltage.

As discussed above, the inventive light generating device comprises a voltage input, adapted for receiving a variable operating voltage. The operating voltage may e. g. correspond to an AC voltage, i.e. from a 120 V or 230 V mains connection. The inventive light generating device thus may preferably be adapted for AC operation.

In the context of the present invention, the term "variable operating voltage" refers to a voltage which varies over time. The variable operating voltage may be a periodically alternating voltage; however and most preferably, the variable operating voltage is a unipolar voltage, such as e. g. a rectified AC voltage.

The voltage input according to the invention may be of any suitable type and e. g. comprise at least two electric terminals, such as solder pads, bond wire pads or any other suitable connector or plug for connection to power or mains. The voltage input may certainly comprise further components or circuits, such as e. g. a rectifier for providing an unipolar variable voltage to the LED units or a filter device for smoothing the received operating voltage. Alternatively or additionally, the voltage input may comprise further mechanical components, for example in case the light generating device is provided to be removed from power, a corresponding seperable electrical connector. Most preferably, the voltage input comprises a lamp socket, such as e.g. an E27 or E14 type socket.

As mentioned above, the light generating device according to the present aspect of the invention further comprises at least two LED units, coupled with said voltage input. The at least two LED units may be coupled with the voltage input directly or indirectly over intermediate components or circuitry, so that in case said operating voltage is supplied to the voltage input, a voltage may be applied to the LED units. The LED units may be of any suitable type and comprise at least one light emitting diode (LED), which in terms of the present invention may be any type of solid state light source, such as an inorganic LED, organic LED or a solid state laser, e. g. a laser diode. The LED unit may certainly comprise more than one of the before mentioned components, connected in series and/or in parallel.

For general lighting applications, the LED unit may preferably comprise at least one multi junction LED, preferably a number of multi junction LEDs with substantially identical forward voltage (Vf). The string of all LEDs as configured for 230 V mains will have a forward voltage between 200-300 V, preferably between 250 V and 290 V, most preferably between 260 and 285 V. For 120 V mains the voltage the string of all LED units preferably show a forward voltage between 100 and 160 V, preferably between 122 and 144 V, most preferably between 130 and 140 V.

The LED unit may certainly comprise further electric, electronic or mechanical components such as a driver unit, e. g. to set the brightness and/or color, a smoothing stage or a filter capacitor.

The configuration circuitry comprises, beside permanent electrical connections, at least one variable connector, which may be a switch, like an analog switch or a relay, a transistor, FET or the like. In the preceding cases, the configuration circuitry may correspond to a switch matrix.

Alternatively, the variable connector may be e.g. a jumper. Usually, the configuration circuitry comprises a plurality of variable connectors, which are needed to provide for the different connections in the first and second state.

The before mentioned at least one controllable shunt path is arranged to provide at least in said second state a low voltage mode, in which said shunt path provides a bypass to at least one LED unit. The term "bypass" herein means that by controlling the shunt path a conductive connection or a current path can be opened/closed that does not include the LED unit that is to be bypassed, or the current flow through this path may be changed. For instance, the shunt path may be connected in parallel to that LED unit. It is also possible that more than one LED unit is bypassed. E.g. in a state where all LED units are connected in series, the shunt path associated with the first LED unit ("first" with respect to the voltage input) may be configured to only bypass the second LED unit or to bypass several LED units, in particular all following LED units. Hereby, even if the momentary operating voltage is lower than the overall forward voltage, one or several LED units may light up, because the overall forward voltage can optionally be "reduced" by bypassing one or several LED units.

According to the present "tapped linear concept", the light generating device is so configured that the bypass is provided in dependence of a momentary amplitude of the operating voltage. For this purpose, the light generating device may preferably comprise a controller that is connected to the at least one shunt path and controls the state of the shunt path(s). The controller in turn may be connected to a voltage detector in order to detect the momentary amplitude of the operating voltage. Alternatively, the voltage drop over a specific LED unit may be detected. For instance, if the voltage drop is below the forward voltage of this LED unit, a bypass will be provided to it. It will be appreciated that here and in the following, a "controller" may be a single device or may consist of several delocalized components.

The controller may be of any suitable type and in particular, the controller may comprise a microcontroller, a computing device and/or an asynchronous state machine comprising at least a logic gate, a flip-flop and/or a comparator.

Although there will be some brightness variation as a part of the LED units are bypassed, at least some of the LED units are active during the largest part of the waveform. In the tapped linear concept, it is highly preferred that some control is provided to ensure that an LED unit is only bypassed if the momentary supply voltage is too low to activate this LED unit.

According to one preferred embodiment of the tapped linear concept, at least one of the shunt paths provides a direct connection to ground, i.e. if this shunt path is controlled accordingly, all "following" LED units are bypassed. According to another type, at least one shunt path is connected in parallel to an LED unit so that when this shunt path is in a low resistance state, the LED unit is bypassed.

The shunt path is controllable to at least a high resistance state and a low resistance state. Preferably, it is further configured to at least limit or control a current flowing through it. In the latter case, the shunt path may be realized with a current regulator having a nominal current mode and an OFF mode, which will be referred to further below.

The shunt path may e. g. comprise a switch, like an analog switch or a relay, optionally connected in series with a resistor, or a suitable current source or current drain device, such as a typical transistor, FET or OP-AMP current source. Suitable current sources may e.g. be found in chapter 13.3 of "Halbleiterschaltungstechnik", U. Tietze, Ch. Schenk, 10th edition, Springer Verlag.

The light generating device may certainly comprise further components, such as one or more further LEDs, a housing, one or more sockets, a smoothing stage, a flicker filter circuit and/or further control circuitry, e. g. to set the color of the emitted light in case of at least one RGB LED unit. Preferably, the light generating device is provided as an integrated unit, such as a lamp, most preferably adapted for retrofit applications.

In one preferred embodiment of the present aspect, the light generating device comprises at least three LED units, wherein in both said first state and said second state a first LED unit and a second LED unit are connected in series with each other and said shunt path is arranged to provide a bypass to said second LED unit. I.e., irrespective of the state of the configuration circuitry, it is possible to bypass the second LED unit. This embodiment allows for better flexibility with regard to the momentary value of the operating voltage.

In another preferred embodiment, the light generating device comprises at least three LED units and at least two shunt paths. Herein at least in the second state a first, second and third LED unit are connected in series. A first shunt path is arranged to provide a bypass to said second LED unit and a second shunt path is arranged to provide a bypass to said third LED unit.

This is the most simple form of a "multi-stage adaption" according to the momentary operating voltage. For instance, when this voltage is higher than the overall forward voltage of all three LED units, both shunt paths are deactivated. When the voltage is too low to power all three LED units, but high enough to power the first two, the second shunt path is activated to provide a bypass to the third LED unit. When the voltage is only high enough to power the first LED unit, the first and second shunt paths are activated to provide a bypass to the second and the third LED unit.

Of course the abovementioned two embodiments can be advantageously combined, so that a multi-stage adaption is possible in both the first and second state. This necessitates at least four LED units. For instance, six LED units could be pair wise connected in parallel in the first state, while all six units are connected in series in the second state.

It is within the scope of the invention that the configuration circuitry can connect the LED units according to three or more states.

According to one further preferred embodiment, the light generating device further comprises a controller, as discussed above. Most preferably, the controller is configured to (e.g. nonrecurringly) determine an effective value of the variable operating voltage and to control the state of the configuration circuitry in dependence said effective value. Herein, "effective value" refers to any value characteristic of the mean magnitude of the voltage over time. E.g., such effective value may refer to the root mean square value of the voltage (i.e. ca. 230V for European mains voltage) or to the amplitude, (i.e. ca. 325V for European mains voltage). In this embodiment, the controller detects the type of voltage supply at least one time, preferably immediately after the light generating device is connected to a power supply or after it is switched on. Since detection will start at a random point in time, the controller must monitor the time evolution of the voltage at least for some time (e.g. for several periods). For a sinusoidal voltage for instance, in a first step, the period length may be determined by detecting the zero crossings of the voltage while in a second step, the amplitude is determined by measuring the voltage half of a period after a zero crossing.

In this embodiment, the controller is connected at least with the configuration circuitry. The configuration circuitry may e.g. comprise several MOSFETs as variable connectors and the controller may be connected to the basis of each MOSFET to control its resistance. Accordingly, the configuration circuitry here corresponds to said switch matrix. In general, the connection between controller and configuration circuitry may be of any wired or wireless type.

In another embodiment, the state of the configuration circuitry is mechanically changeable. This is largely an alternative to the aforementioned embodiment in which the controller detects the type of supply voltage, but may be used also in addition to the preceding embodiment. The configuration state may in particular be a changeable by at least one jumper which is repositioned corresponding to a state. The state may be set in a factory or in a store before the light generating device is sold and/or it may be set by a customer before use. It may e.g. be set manually or by means of simple tools like a screwdriver or tweezers.

Since one device will often be intended for use in a region with a known mains voltage, the state of the configuration circuitry can be adapted without the need for a controller to detect the voltage. The situation is similar with a customer who knows what mains voltage is used in his home region. Although this embodiment is not "fail-safe" in that a wrong state may be chosen, it may be cost-efficient by simplifying the required control circuitry.

As already mentioned above, it is conceivable that the tapped linear concept is combined with the dynamic switching concept. Likewise, any features disclosed above in context with favorable embodiments of one concept may be employed in connection with the respective other concept.

BRIEF DESCRIPTION OF THE DRAWINGS

These and other aspects of the invention will be apparent from and elucidated with reference to the embodiments described hereinafter in which:

FIG. 1 is a block diagram showing an embodiment of a light generating device according to a first aspect of the present invention in a schematic view;

FIG. 2 shows a detailed block diagram of a switch matrix and LED circuits according to the embodiment of FIG. 1;

FIGS. 6A-6B illustrate two switching modes of the light generating device according to FIG. 5;

FIGS. 8A-8B illustrate two switching modes of the light generating device according to FIG. 7.

DETAILED DESCRIPTION OF EMBODIMENTS

Figure 3:
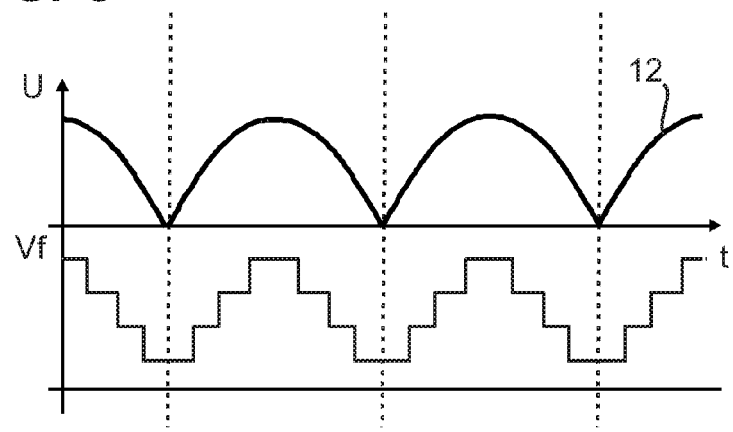
FIG. 3 shows a timing diagram of the operation of the embodiment according to FIG. 1.

FIG. 1 shows an embodiment of a light generating device 1 according to the present invention in a schematic view. The light generating device 1 has a voltage input 21, adapted for receiving a variable operating voltage, such as an AC mains voltage. The voltage input 21 is connected with a typical bridge-rectifier 23 for receiving the variable voltage and providing a rectified, unipolar AC voltage $U_{IN}$ to a switch matrix 30. The corresponding output signal 12 of the rectifier 23 is shown in FIG. 3.

The rectifier 23 is connected with a voltage input terminal 31 of a switch matrix 30 to provide said rectified voltage $U_{IN}$ to the switch matrix 30. The switch matrix 30 is connected with a number of at least three LED circuits 10. As shown in FIG. 1, according to the present embodiment, four LED circuits 10a, 10b, 10c, 10d are provided. While FIG. 1 shows a number of four LED circuits 10, it is certainly possible that a different number of LED circuits 10 are provided and accordingly connected with the switch matrix 30.

Each of the LED circuits 10a-10d comprises a LED unit 14a-14d and a controllable current regulator 15a-15d. According to the present embodiment, each LED unit 14 comprises a light emitting diode (LED); however, the LED units 14 might certainly comprise more than one LED, connected in series and/or parallel with each other. The current regulators 15 are provided to control the current in each respective LED circuit 10 to a predefined current level, which for each of the regulators 15 is individually set by a controller 50 using corresponding control connections 16.

According to the present embodiment, the controller 50 comprises a microprocessor (not shown), having a suitable programming in its memory. Besides the connection with the current regulators 15, the controller 50 is further connected with a control input 35 of the switch matrix 30 to set the switch matrix 30 to one of a plurality of given switching modes, as will be explained in detail with reference to the following figures. To set the respective switching mode, the controller 50 is further connected with the rectifier 23 over a connection 24, to receive values, corresponding to the momentary amplitude of the variable operating voltage, applied to the voltage input 21.

The functionality of the light generating device 1 during operation will be hereinafter explained with reference to FIG.

2, which shows a detailed schematic circuit diagram of the LED circuits 10a-10d and the switch matrix 30 according to the embodiment of FIG. 1.

As can be seen from FIG. 2, the switch matrix 30 comprises three switches 25, 26, 27, provided to allow a serial and/or parallel connection of the LED units 14a-14d of the respective LED circuits 10a-10d. According to the present example, the switches 25, 26, 27 are bipolar or field-effect transistors, individually controllable by the controller 50 over the control input 35. Bridge circuits 28 are provided, allowing to connect at least two of the LED units 14a-14d in series. In each of the bridge circuits 28, a diode 29 is arranged to allow an easy series connection of subsequent LED units 14a-14d in case one of the switches 25, 26, 27 is open. As can be seen from FIG. 2, the current regulators 15a-15d are connected in series with the respective LED units 14a-14d of the LED circuits 10a-10d at least in case all of the switches 25, 26, 27 are closed, resulting in a parallel connection of all LED units 14a-14d.

As discussed above, the controller 50 is provided to determine the variable operating voltage $U_{IN}$ over the connection 24 to set the switching mode of the switch matrix 30. In addition, the controller 50 is provided with four voltage detectors 2a-2d to determine the voltage over each of the current regulators 15a-15d and with current detectors 3a-3d to determine the current, flowing through each of the current regulators 15a-15d.

The controller 50 allows setting the switch matrix 30 and thus the switches 25, 26, 27 in multiple switching modes. Four of the most relevant switching modes will be described hereinafter with reference to the FIGS. 4A-4D, which show the resulting electrical connection of the LED units 14a-14d and the current regulators 15a-15d with the voltage input terminal 31 of the switch matrix 30 and thus with power. For reasons of clarity, the switch matrix 30, the switches 25, 26, 27 and the further components of the device 1 are omitted in FIGS. 4A-4D.

The shown switching modes of FIG. 4A-4D differ from each other in the overall forward voltage $V_f$, i.e. the overall voltage drop over the LED circuits 10a-10d when said operating voltage is applied to the voltage input 21.

Figure 4A:
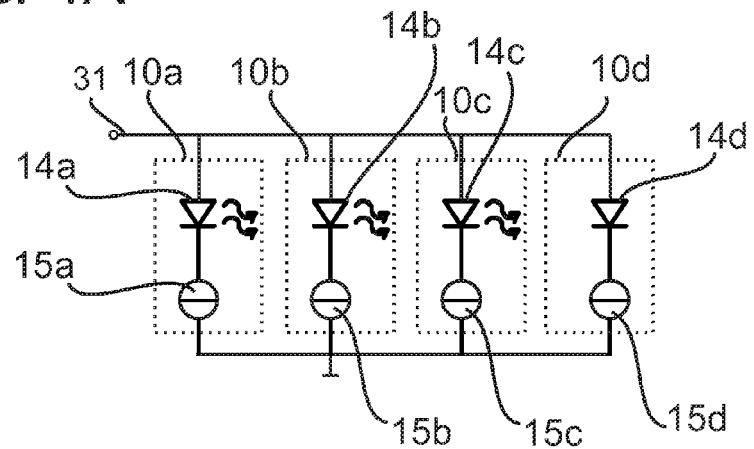
FIGS. 4A-4D illustrate several switching modes of the switch matrix according to FIG. 2 in schematic representations.

FIG. 4A shows a first switching mode. As can be seen from the figure, all of the switches 25-27 of the switching matrix 30 are set in a closed, conductive state. Accordingly, the LED units 14a-14d are connected parallel with each other, resulting in a low overall forward voltage $V_{f1}$.

In the present first switching mode, the current regulators 15a-15d are set to control the current to a nominal current, which corresponds to the nominal current of the respective LED unit 14a-14d, $I_{NOM}$. Due to the thus formed series connection of each of the current regulators 15a-15d with the respective, associated LEDs units 14a-14d of the LED circuits 10a-10d, the current in each of the LED circuits 10a-10d can be independently controlled, which advantageously allows the use of so-called "unbinned" LEDs, so that discontinuities of the light output, e. g. flicker and stroboscopic effects, are avoided.

Figure 4B:
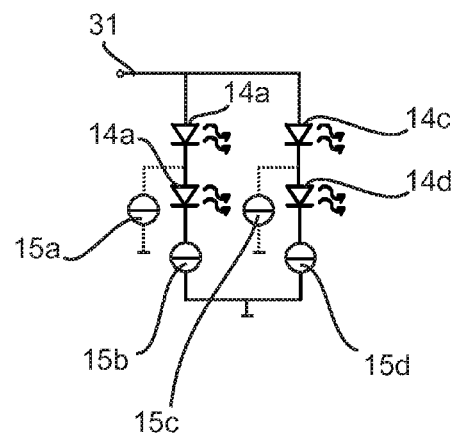

A second switching mode is shown in FIG. 4B. According to the second switching mode, the switches 25, 27 are set to an open, non-conductive state. Switch 26 is set to its closed position. According to the present second switching state, current regulators 15a, 15c are set to an OFF mode, as depicted by the dotted lines in FIG. 4B, so that no substantial current flows through these current regulators. The correspondingly remaining current regulators 15b, 15d are set to the before mentioned nominal current mode, so that the current through both parallel paths is controlled to $I_{NOM}$. Accordingly, the switching state provides that the LED units 14a and 14b as well as 14c and 14d are connected in series, while the overall two series connections are connected parallel to each other. The second switching mode thus results in an overall forward voltage $V_{f2}$, higher than the overall forward voltage $V_{f1}$ in the first switching mode according to FIG. 4A.

Figure 4C:
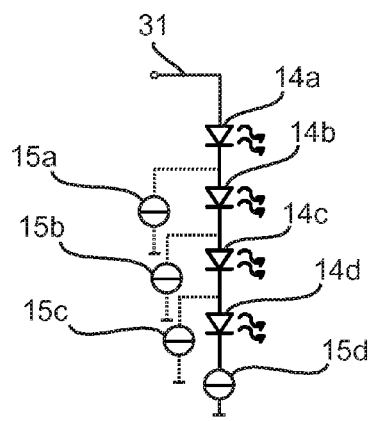

A third switching mode is shown in FIG. 4C. As can be seen from the figure, all of the LED units 14a-14d are connected in series. To set the switch matrix 30 in the third switching mode, all of the switches 25-27 are set to the open, nonconductive state. Current regulators 15a-15c are correspondingly set to the before-mentioned OFF mode, while current regulator 15d is set to the nominal current mode, so that the current is controlled to $I_{NOM}$. The shown third switching mode provides an overall forward voltage $V_{f3}$, higher than the forward voltage $V_{f1,2,4}$ in all other modes.

Figure 4D:
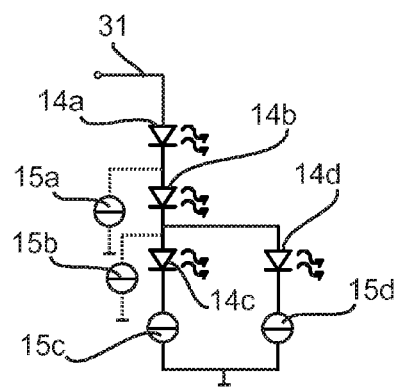

A further and optional fourth switching mode is shown in FIG. 4D. As can be seen from the figure, the LED units 14a-14c are connected in series with each other. To set the switching matrix in the present fourth switching mode, switches 25, 26 are set to an open state. Current regulators 15a, 15b are set to the OFF mode. The fourth switching mode provides an intermediate overall forward voltage $V_{f4}$, higher than the forward voltage according to the second switching mode $V_{f2}$, but lower than the overall forward voltage $V_{f3}$ in the third switching mode.

As shown in FIG. 4D, the LED unit 14d is connected parallel to the LED unit 14c, which is obtained by setting the switch 27 to the closed state. Since accordingly the current is shared by the LED units 14c and 14d, each of the current regulators 15c and 15d is set to a reduced current mode, which corresponds to approximately ⅔ of $I_{NOM}$. It is however noted, that in the fourth switching mode, it is alternatively possible to set the current regulator 15d to the OFF mode, which results in a corresponding intermediate overall forward voltage. However, the operational mode of FIG. 4D has the advantage that all of the four LED units 14a-14d are provided with an operating current in this mode, resulting in a enhanced and homogeneous light output.

The respective switching mode is set by the controller 50 mainly in dependence of the momentary value of the operating voltage $U_{IN}$, received over connection 24. Since however and as mentioned above, the electrical characteristics of the LED units 14a-14d might differ from each other, the controller 50 monitors the voltages and the corresponding currents in each of the LED circuits 10a-10d using the voltage detectors 2a-2d and the corresponding current detectors 3a-3d. The controller 50 determines the momentary value of the operating voltage $U_{IN}$, the voltages and currents in the LED circuits 10a-10d in a quasi continuous way, so that a change in the voltages and/or currents can be efficiently detected.

The output signal 12 of the rectifier 23 is shown in the upper part of the timing diagram, shown in FIG. 3. As discussed above, the rectifier 23 provides a unipolar variable voltage $U_{IN}$. The controller 50 determines the momentary value of the voltage 12 and sets the switch matrix 30 to a switching mode, so that the overall forward voltage of the light generating device 1 closely matches the momentary value of the variable voltage, e.g. the output signal 12. The corresponding overall forward voltage $V_f$ is shown in the lower part of FIG. 3.

When the light generating device 1 is connected with power, the switch matrix 30 is initially set to the first switching mode, since the first switching mode is the most compatible operating mode independent of the momentary value of the operating voltage. The controller 50 correspondingly sets all switches 25, 26, 27 to the closed state and controls the current regulators 15 to $I_{NOM}$. The controller 50 then determines, whether the operating voltage $U_{in}$ increases and conforms with the following equations:

$$U_a > U_{in} - U_b \quad [1]$$

and $$U_c > U_{in} - U_d, \quad [2]$$

to determine, whether the operating voltage $U_{in}$ is high enough to switch to the second switching mode. In the following the variables $U_{a-d}$ and $I_{a-d}$ refer to the voltages and currents in the respective LED circuit 10a-10d, as determined by the voltage detectors 2a-2d and the current detectors 3a-3d, respectively.

In case the operating voltage $U_{in}$ is high enough to satisfy the above equations, the switching matrix 30 is set to the second switching mode, as shown in FIG. 4B. In case the electrical characteristics of the LED units 14a-14d are highly different from each other, it may be possible, that for example the voltage $U_{in}$ is high enough to drive the LED units 14a and 14b in series, while the voltage does not allow a series connection of the LED units 14c and 14d. In this case, only the above equation [1] of the two equations will be satisfied and accordingly only the two LED units 14a, 14b are connected in series, while the LED units 14c and 14d remain connected parallel with each other and the series connection of the LED units 14a, 14b.

In case the voltage $U_{in}$ is high enough to drive three of the LED units 14a-14d in series, i. e.

$$U_b > U_{in} - U_c,$$

and $$U_b > U_c - U_d,$$

the switch matrix is set to the fourth switching mode by the controller 50, in which, as mentioned, the switches 25, 26 are open, the switch 27 is closed. The current regulators 15a, 15b are set to the OFF mode, while the current regulators 15c and 15d are each set to $\frac{2}{3} * I_{NOM}$.

In case of a further increase of the voltage $U_{in}$, i. e. in case the operating voltage $U_{in}$ is high enough to drive the four LED units 14a-14d in series, the switch matrix 30 is set to the third switching mode, showing the highest forward voltage $V_f$. The controller 50 accordingly determines, whether the following equation is met, so set the switch matrix 30 from the fourth to the third switching mode:

$$U_c > U_b - U_d.$$

When the operating voltage $U_{in}$ decreases, the switching matrix 30 is correspondingly set to the most appropriate switching mode, having a lower overall forward voltage $V_f$, so that the LED units 14a-14d still can be operated.

While in the above, i.e. when switching from a mode, having a lower forward voltage $V_f$ to a mode, showing a higher forward voltage $V_f$, it is sufficient to determine the voltages in each of the switching circuits 10a-10d and the operating voltage $U_{in}$, it is advantageous in case of a decrease of the operating voltage $U_{in}$ to determine the most appropriate switching mode on the basis of the currents in each of the LED circuits 10a-10d. The according operating advantageously avoids an operational state, in which the voltage $U_{in}$ already dropped below the forward voltage, necessary for driving the LED units 14a-14d in the corresponding switching mode. Accordingly, the controller 50 is provided to determine a substantial decrease of the currents, determined by current detectors 3a-3d.

Thus, the controller 50 sets the switch matrix 30 from the third switching mode to the fourth switching mode, when the following equation is met:

$$I_d < 0.95 * I_{NOM}.$$

Accordingly, the controller 50 sets the switch matrix 30 from the fourth to the second switching mode, in case the following condition is met:

$$I_c + I_d < 1.333 * 0.95 * I_{NOM}.$$

In case the controller 50 finds that $$I_b < 0.95 * I_{NOM}$$

and/or $$I_d < 0.95 * I_{NOM},$$

the switch matrix is set from the second switching mode to the first switching mode, wherein as discussed above, it is possible that the LED units 14a and 14b and the LED units 14c and 14d are independently switched to the first switching mode.

In any event, the controller 50 accordingly determines the most appropriate switching mode to provide a continuous light output without flicker and stroboscopic effects.

From the above, it will become apparent that the light generating device 1 chooses the switching mode, which most closely matches the momentary voltage. In addition, the device 1 can further be used with different mains voltage systems, e.g. 120V and 240V. For example, if the device 1 is designed for a 240V mains grid and operated with 120V, also here, the most suitable switching mode is used. Certainly, depending on the specific setup, some of the switching modes may be left unused in this scenario.

Figure 5:
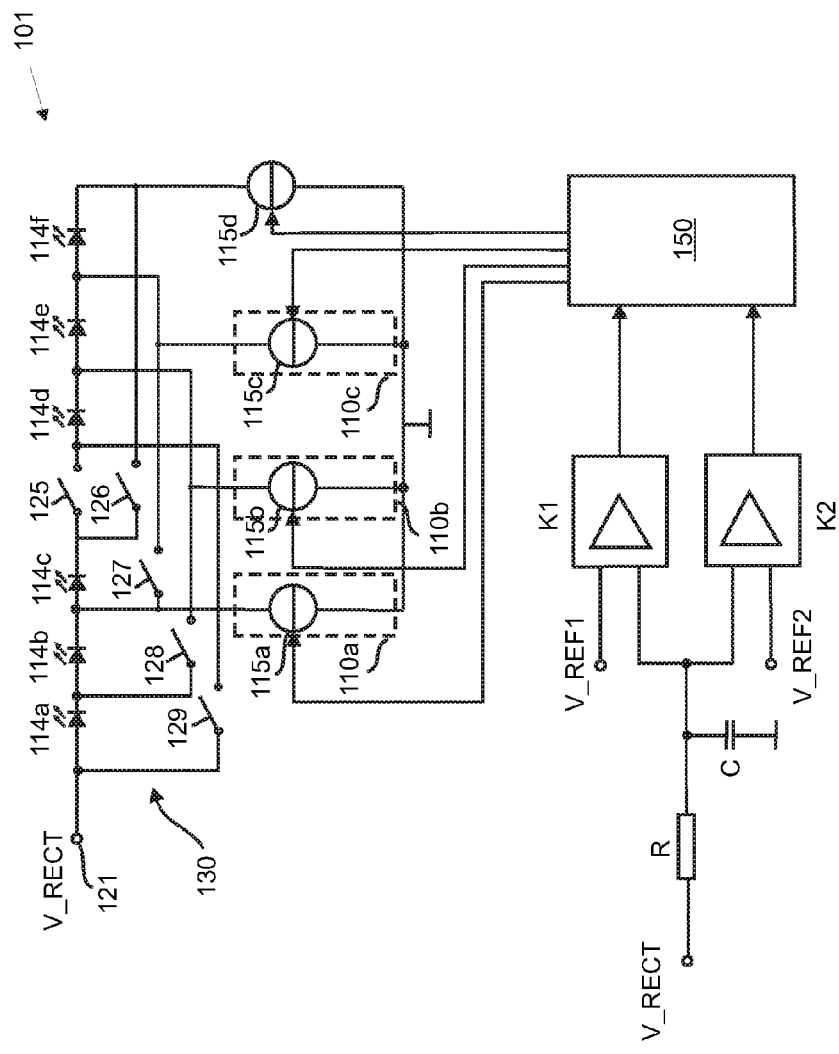
FIG. 5 is a schematic representation of a second embodiment of a light generating device according to a second aspect of the present invention.

Now referring to FIG. 5, there is shown another embodiment of a light generating device 101 according to the present invention. This embodiment follows a tapped linear concept. The light generating device 101 comprises six LED units 114a-114f, each of which in the present embodiment consists of an approximately 48V LED package. The LED units 114 are connectable by configuration circuitry 130, which comprises a set of five switches 125-129. Here again, the switches 125-129 can be bipolar or field-effect transistors.

A first, second and third LED unit 114a-114c are connected in series and a fourth, fifth and sixth LED unit 114d-114f are also connected in series. The third and fourth LED unit 114c, 114d are connectable in series via a first switch 125. The negative sides of the third and sixth LED unit 114c, 114f are connectable via a second switch 126. The positive sides of the third and sixth LED unit 114c, 114f are connectable via a third switch 127. The positive sides of the second and fifth LED unit 114b, 114e are connectable via a fourth switch 128. The positive sides of the first and fourth LED unit 114a, 114d are connectable via a fifth switch 129.

Further, the negative side of the second LED unit 114b is connected to ground via a first shunt path 110a, comprising a current regulator 115a. Similarly, the negative side of the fourth LED unit 114d is connected to ground via a second shunt path 110b with a second current regulator 115b, the negative side of the fifth LED unit 114e is connected to ground via a third shunt path 110c with a current regulator 115c and the negative side of the sixth LED unit 114f is connected to ground via a fourth current regulator 115d. The positive side of the first LED unit 114a receives via a supply terminal 121a rectified supply voltage V_RECT, which results from rectifying a mains voltage.

The light generating device 101 also comprises a controller 150, which controls the switches 125-129 according to a state of the configuration circuitry 130. Furthermore, the controller 150 controls the current regulators 115.

In this embodiment, the state of the configuration circuitry 130 depends on an effective value of the supply voltage. In order to determine the effective value, the rectified voltage V_RECT is applied to a low pass, which consists of a resistor R and a capacitor C, which is connected to ground. Thus, the rectified voltage V_RECT is smoothened and although it is not totally constant over time, it is always within e.g. 60-70% of the amplitude of the supply voltage. Therefore, it is possible to distinguish between a 230V mains voltage and a 120V mains voltage. This is done by two comparators K1, K2, to which the smoothened voltage is afterwards input. Each comparator K1, K2 additionally receives a first and second reference voltage, respectively. The first comparator K1 receives a first reference voltage V_REF1, e.g. 180V, which corresponds to ca. 55% of the amplitude of a 230V mains voltage, but is above the amplitude of a 120V mains voltage. If the smoothened voltage is larger than the reference voltage V_REF1, this indicates that the mains voltage is 230V. Accordingly, the first comparator K1 outputs a signal into the controller 150.

In the same manner, the second comparator K2 receives a second reference voltage V_REF2, e.g. 95V, which corresponds to ca. 55% of the amplitude of a 120V mains voltage. If the smoothened voltage is larger than the reference voltage V_REF2, this indicates that the mains voltage is at least 120V. Accordingly, the second comparator K2 outputs a signal into the controller 150.

If the controller 150 receives a signal from the second comparator K2, but no signal from the first comparator K1, it will set the switches 126-129 to a first state, wherein the first switch 125 is open and all other switches 126-129 are closed. In this state, the first and fourth LED unit 114a, 114d, the second and fifth LED unit 114b, 114e and the third and sixth LED unit 114c, 114f are each pair wise connected in parallel. Further, the controller 150 sets the first current regulator 115a to an OFF mode.

If the controller 150 receives a signal from the first comparator, it will set the switches 125-129 according to a second state. In this state, the first switch 125 is closed, while all other switches 126-129 are open. Thus, all LED units 114 are connected in series. Thus, the overall forward voltage of the light generating device 101 is at maximum. This detection and switching is only performed once when the light generating device 101 is activated, which is sufficient since the type of mains voltage does not change during operation.

The two different switching modes will now be explained with reference to FIGS. 6A and 6B, which only show the LED units 114, the current regulators 115 and the connections provided by the configuration circuitry 130. As can be seen from FIG. 6A, in the first state, a first pair of LED units 114a, 114d, a second pair of LED units 114b, 114e and a third pair of LED units 114c, 114f are connected in series with each other, while the LED units of each pair are connected in parallel to each other. Therefore, the overall forward voltage of the device is reduced to 144V. In this state, the first current regulator 115a is permanently set to an OFF mode. Since the amplitude of the mains voltage is only ca. 170V, the momentary value of the operating voltage would be below the overall forward voltage during a large part of the waveform, rendering all LED units 114 inactive. However, the current regulators 115 are connected to bypass the following LED units. For instance, the second current regulator 115b provides a bypass with respect to the second, third, fifth and sixth LED unit 114b, 114c, 114e, 114f. The combined forward voltage of the first and fourth LED unit 114a, 114d—which are now connected in parallel—on the other hand, is only 48V. Therefore, as soon as the momentary supply voltage exceeds this value, a current will flow through the aforementioned units 114a, 114d, provided that the second current regulator 115b is in a low-resistance state. In particular, the second current regulator 115b will be set to control the current to a nominal current of the LED units 114. However, the current regulators 115 must be set to provide for a current that is twice as high as for a single LED unit, since it corresponds to the nominal current of two LED units connected in parallel.

When the supply voltage rises above 96V, the voltage across the second and fifth LED unit 114b, 114e will exceed their respective forward voltage, which can be detected by a voltage detector (not shown). Now, the first, second, fourth and fifth LED units 114a, 114b, 114d, 114e can be activated. Thus, the controller 150, which is connected to the voltage detector, sets the second current regulator 115b to an OFF state, while it sets the third current regulator 115c to control the current to a nominal current of the LED units 114a, 114b, 114d, 114e (which corresponds to twice the nominal current for a single LED unit).

As the supply voltage rises further, the remaining LED units 114c, 114f will also be activated by similarly setting the third current regulator 115c to an OFF mode and setting the fourth current regulator 115d to provide for a nominal current.

As voltage drops again according to the waveform, the process may be reversed. By measuring the voltage over the sixth LED unit 114f (and/or third LED unit 114c), the controller 150 will detect when the supply voltage drops below the overall forward voltage of the LED units 114. Accordingly, the controller 150 sets the third current regulator 115c to provide for a nominal current. It is possible, but not necessary to set the fourth current regulator 115d to an OFF mode. As the supply voltage drops further, the process is repeated with the second current regulator 115b.

Now referring to FIG. 6B, there is shown the second state. As can be seen, now all LED units 114 are connected in series. Therefore, the overall forward voltage of the device is 6×48V=288V. Since the amplitude of the mains voltage is only ca. 325V, the momentary value of the operating voltage would be below the overall forward voltage during a large part of the waveform, rendering all LED units 114 inactive. However, the current regulators 115 are connected to bypass the following LED units. For instance, the first current regulator 115a provides a bypass with respect to the third to sixth LED unit 114c-114f. The combined forward voltage of the first and second LED unit 114a, 114b on the other hand, is only 96V. Therefore, as soon as the momentary supply voltage exceeds this value, a current will flow through the aforementioned units, provided that the first current regulator 115a is in a low-resistance state. In particular, the first current regulator 115a will be set to control the current to a nominal current of the LED units.

When the supply voltage rises above 192V, the voltage across the third and fourth LED 114c, 114d unit will exceed their combined forward voltage, which can be detected by a voltage detector (not shown). Now, the first four LED units 114a-114d are activated. Thus, the controller 150, which is connected to the voltage detector, sets the first current regulator 115a to an OFF state, while it sets the second current regulator 115b to control the current to a nominal current of the LED units.

As the supply voltage rises further, the remaining LED units 114e, 114f will also be activated by similarly setting the second current regulator 115b (third current regulator 115c)

to an OFF mode and setting the third current regulator 115c (fourth current regulator 115d) to provide for a nominal current.

As voltage drops again according to the waveform, the process may be reversed. By measuring the voltage over the sixth LED unit 114f, the controller 150 will detect when the supply voltage drops below the overall forward voltage of the LED units 114. Accordingly, the controller 150 sets the third current regulator 115c to provide for a nominal current. It is possible, but not necessary to set the fourth current regulator 115d to an OFF mode. As the supply voltage drops further, the process is repeated with the other current regulators 115a, 115b.

Figure 7:
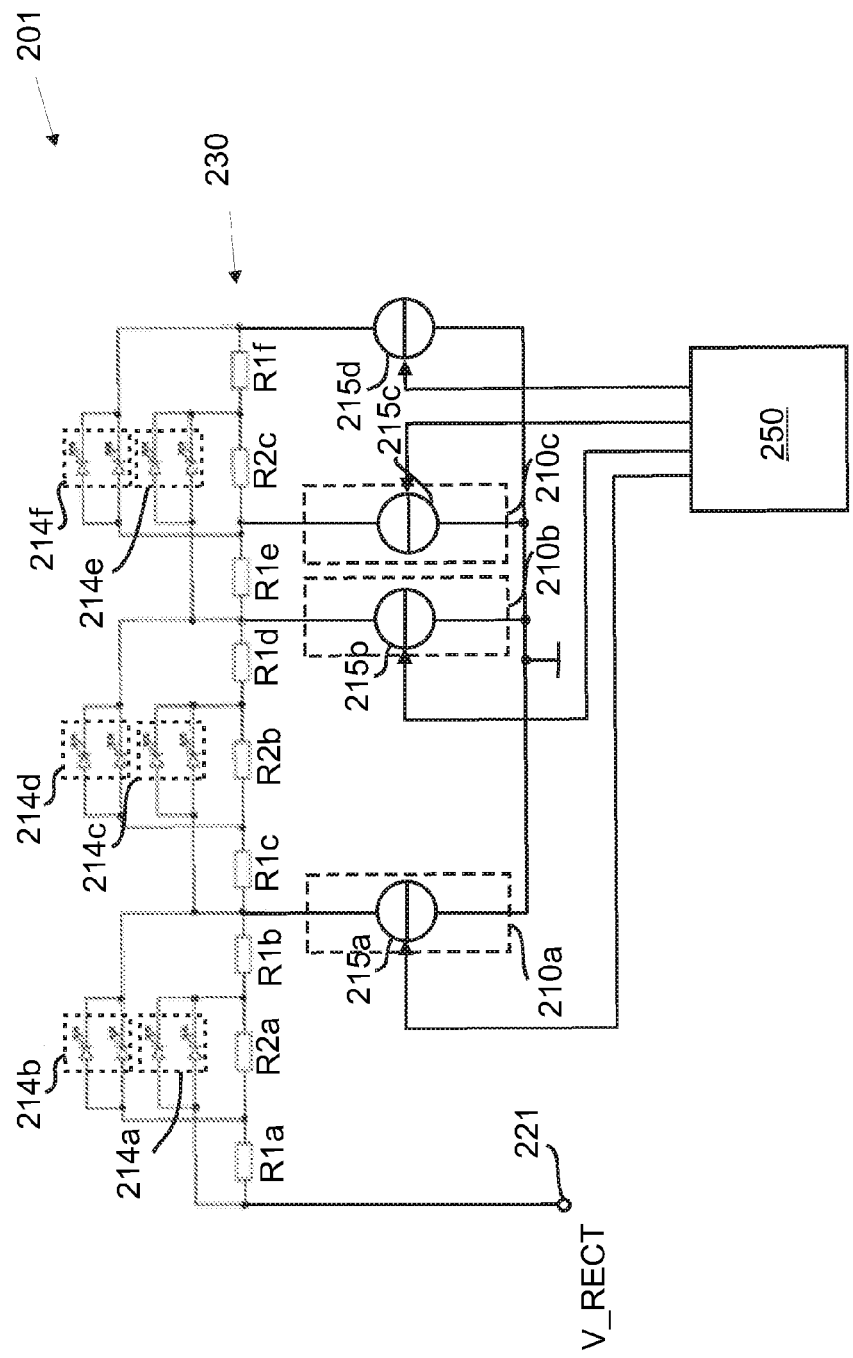
FIG. 7 shows a schematic view of a third embodiment of a light generating device according to a second aspect of the present invention.

While in the above described embodiment the mains voltage is detected and the controller 150 sets the switches to a corresponding state, FIG. 7 shows another embodiment, where the connectors of the configuration circuitry 230 can be operated mechanically.

Here, again, the light generating device 201 comprises six LED units 214a-214f, each of which consists of two parallel connected LEDs. The positive side of the first LED unit 214a is connected to a supply terminal 221 to receive a supply voltage V_RECT.

The configuration circuitry 230 comprises two sets of jumpers R1a-R1f, R2a-R2c, which are realized by resistors having negligible resistance. The first set of jumpers R1a-R1f is only to be connected if the device is intended for use with a 120V mains voltage. The second set of jumpers R2a-R2c is only to be connected if the device is intended for use with a 230V mains voltage. Shunt paths 210a-210c are provided according to the preceding embodiment.

The negative side of the second LED unit 214b and the positive side of the third LED unit 214c are permanently connected, as well as the negative side of the fourth LED unit 214d and the positive side of the fifth LED unit 214e. The negative side of the second LED unit 214b is permanently connected to a first current regulator 215a. The negative side of the fourth LED unit 214d is permanently connected to a second current regulator 215b, the positive side of the sixth LED unit 214f is permanently connected to a third current regulator 215c and the negative side of the sixth LED unit 214f is permanently connected to a fourth current regulator 215d.

The light generating device 201 also comprises a controller 250, which controls the current regulators 215. In this embodiment, the controller 250 does not detect an effective value of the supply voltage V_RECT, so the number and/or complexity of the components can be reduced with respect to the embodiment shown in FIGS. 5-6B.

When the first set of jumpers R1a-R1f is in place, the positive and negative sides of the first and second LED unit 214a, 214b are connected, the positive and negative sides of the third and fourth LED unit 214c, 214d are connected, and the positive and negative sides of the fifth and sixth LED unit 214e, 214f are connected. Hence, the LED units are pair wise connected in parallel, while the three pairs are connected in series. This configuration is shown in FIG. 8A. Here, the third current regulator 215c is set permanently to an OFF mode, because it is short-circuited with the second current regulator 215b. Alternatively, the second current regulator 215b could be set to an OFF mode.

When the second set of jumpers R2a-R2c is in place, as shown in FIG. 8B, the negative side of the first LED unit 214a is connected with the positive side of the second LED unit 214b, the negative side of the third LED unit 214c is connected with the positive side of the fourth LED unit 214d, and the negative side of the fifth LED unit 214e is connected with the positive side of the sixth LED unit 214f. Hence, all LED units are connected in series.

Thus, the general arrangement of the LED units in the two states does not differ from the abovementioned, although the pairs are arranged in a different combination. However, in the first state, either the second current regulator 215b or the third current regulator 215c may be permanently set to an OFF mode, since these two are short-circuited in this state.

The working principle of the current regulators 215 and the way they are controlled by the controller 250 do not differ from the abovementioned example and need not be explained again.

In this embodiment, the jumpers R1a-R1f, R2a-R2c may be put in and/or taken out manually or by means of simple tools. Since the total number of jumpers is relatively high in the present embodiment, this is a rather complex task for a customer to do. However, in a production process, the configuration circuitry 230—excluding the jumpers—may be produced as a printed circuit board in the same way for both the US market and the European market. Afterwards, the corresponding jumpers may be placed e.g. in another factory in the country where the light generating device 201 is to be sold. However, it is conceivable that either set of jumpers may be operated with one handle or the like, so that repositioning can also be done by a customer.

It will be appreciated that the latter two embodiments have been described with reference to LED units 114, 214, each one could also form part of LED circuits together with respective or "dedicated" current regulators to control the current in the respective LED unit.

While the invention has been illustrated and described in detail in the drawings and foregoing description, such illustration and description are to be considered illustrative or exemplary and not restrictive; the invention is not limited to the disclosed embodiments.

For example, it may be possible to operate the invention in an embodiment, in which:
the controller 50 instead of having a microcontroller, comprises a further control device, such as e.g. a asynchronous state machine comprising at least a logic gate, a flip-flop and/or a comparator and/or
the controller 50 when switching from a mode, having a higher overall forward voltage to a mode, having a lower overall forward voltage, instead of being adapted to determine the most appropriate switching mode on the basis of the currents in each of the LED circuits 10a-10d, the controller 50 is adapted to determine the most appropriate switching mode on the basis of the voltages in each of the switching circuits 10a-10d.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:
1. A light generating device comprising:
a voltage input for receiving a variable operating voltage,
at least three LED circuits, coupled with said voltage input,
wherein each LED circuit comprises a LED unit, and a controllable current regulator, connected with said LED unit and configured to control a current in said LED circuit, a controllable switch matrix, connected with said at least three LED circuits and comprising a plurality of switches, said switch matrix being configured to operate in at least two different switching modes, and a controller, connected at least with said switch matrix, configured to determine said variable operating voltage and to control the switching mode of said switch matrix in dependence of the determined operating voltage, said switch matrix being further configured so that at least two of said LED units are connected in parallel to each other in a first switching mode, and are connected in series with each other in a second switching mode.

2. The light generating device according to claim 1, wherein said switch matrix is configured to operate in at least three different switching modes, and said switch matrix being further configured, so that in said first switching mode, all of said LED units are connected parallel to each other, in a said second switching mode, at least two of said LED units are connected in series, and in a third switching mode, all of said LED units are connected in series with each other.

3. The light generating device according to claim 2, wherein said controller is further connected with at least one of said current regulators to control the current in said LED circuits.

4. The light generating device according to claim 3, wherein at least one of said current regulators is at least controllable to a nominal current mode and an OFF mode.

5. The light generating device according to claim 4, wherein at least one of said current regulators is further controllable to a reduced current mode in which the current in said LED circuit is lower than the current in said nominal current mode.

6. The light generating device according to claim 5, wherein said controller comprises a voltage detector, adapted to determine a voltage in at least one of said LED circuits, said controller being further configured to control the switching mode in dependence of the determined voltage.

7. The light generating device according to claim 6, wherein said controller comprises a current detector, adapted to determine a current in at least one of said LED circuits, said controller being further configured to control said switching mode in dependence of the determined current.

8. The light generating device according to claim 7, wherein in said second switching mode, at least two of said LED units are connected in series, while at least two of said LED units are connected parallel to each other.

9. The light generating device according to claim 8, wherein said LED circuits are configured, so that at least in said first switching mode, the LED unit of each LED circuit is connected in series with the respective current regulator of said LED circuit.

10. The light generating device according to claim 9, wherein at least four LED circuits are provided with a LED unit and a corresponding current regulator.

11. The light generating device according to claim 10, wherein said switch matrix is further configured to operate at least in a fourth switching mode, in which at least three LED units are connected in series.

12. The light generating device according to claim 11, wherein at least one of said LED circuits comprises multiple LED units and configuration circuitry to provide voltage level adaptation, which configuration circuitry is adapted to connect at least two of the multiple LED units in said LED circuit in parallel to each other in a first state and in series with each other in a second state.

13. A light generating device comprising:

a voltage input for receiving a variable operating voltage, two LED units, coupled with said voltage input, configuration circuitry, adapted to connect at least two of said LED units in parallel with each other in a first state and in series with each other in a second state to provide voltage level adaptation, and at least one controllable shunt path, comprising a controllable current regulator, arranged to provide at least in said second state a low voltage mode, in which said shunt path provides a bypass to at least one LED unit, wherein the light generating device is so configured that said bypass is provided in dependence of a momentary amplitude of said operating voltage.

14. The light generating device according to claim 13, comprising at least three LED units, wherein in both said first state and said second state a first LED unit and a second LED unit are connected in series with each other and the at least one shunt path is arranged to provide a bypass to said second LED unit.

15. The light generating device according to claim 14, comprising at least three LED units and at least two shunt paths, wherein at least in said second state a first, second and third LED unit are connected in series and a first shunt path is arranged to provide a bypass to said second LED unit and a second shunt path is arranged to provide a bypass to said third LED unit.

16. The light generating device according to claim 15, further comprising a controller, which is configured to at least nonrecurringly determine an effective value of said variable operating voltage and to control the state of the configuration circuitry in dependence said effective value.

17. A method of operating a light generating device, the light generating device comprising a voltage input, at least three LED circuits, coupled with said voltage input, wherein each LED circuit comprises a LED unit and a controllable current regulator, connected with said LED unit and configured to control a current in said LED circuit, said light generating device further comprising a controllable switch matrix, connected with said at least three LED circuits and comprising a plurality of switches, the method comprising:

receiving a variable operating voltage by the voltage input, operating said switch matrix in at least two different switching modes in dependence of said variable operating voltage, connecting at least two of said LED unit in parallel in a first switching mode, and connecting at least two of said LED units in series in a second switching mode.

18. A method for operating a light generating device, the light generating device comprising a voltage input, at least two LED units, coupled with said voltage input, said light generating device further comprising a configuration circuitry, connected with said at least two LED units, receiving a variable operating voltage by said voltage input, connecting at least two of said LED units in parallel with each other in a first state and connecting at least two of said LED units in series with each other in a second state,
providing voltage level adaptation and a controllable shunt path, arranged to provide at least in said second state a low voltage mode, in which said shunt path provides a bypass to at least one LED unit, wherein said bypass is provided in dependence of a momentary amplitude of said operating voltage.

* * * * *